Figure 1:
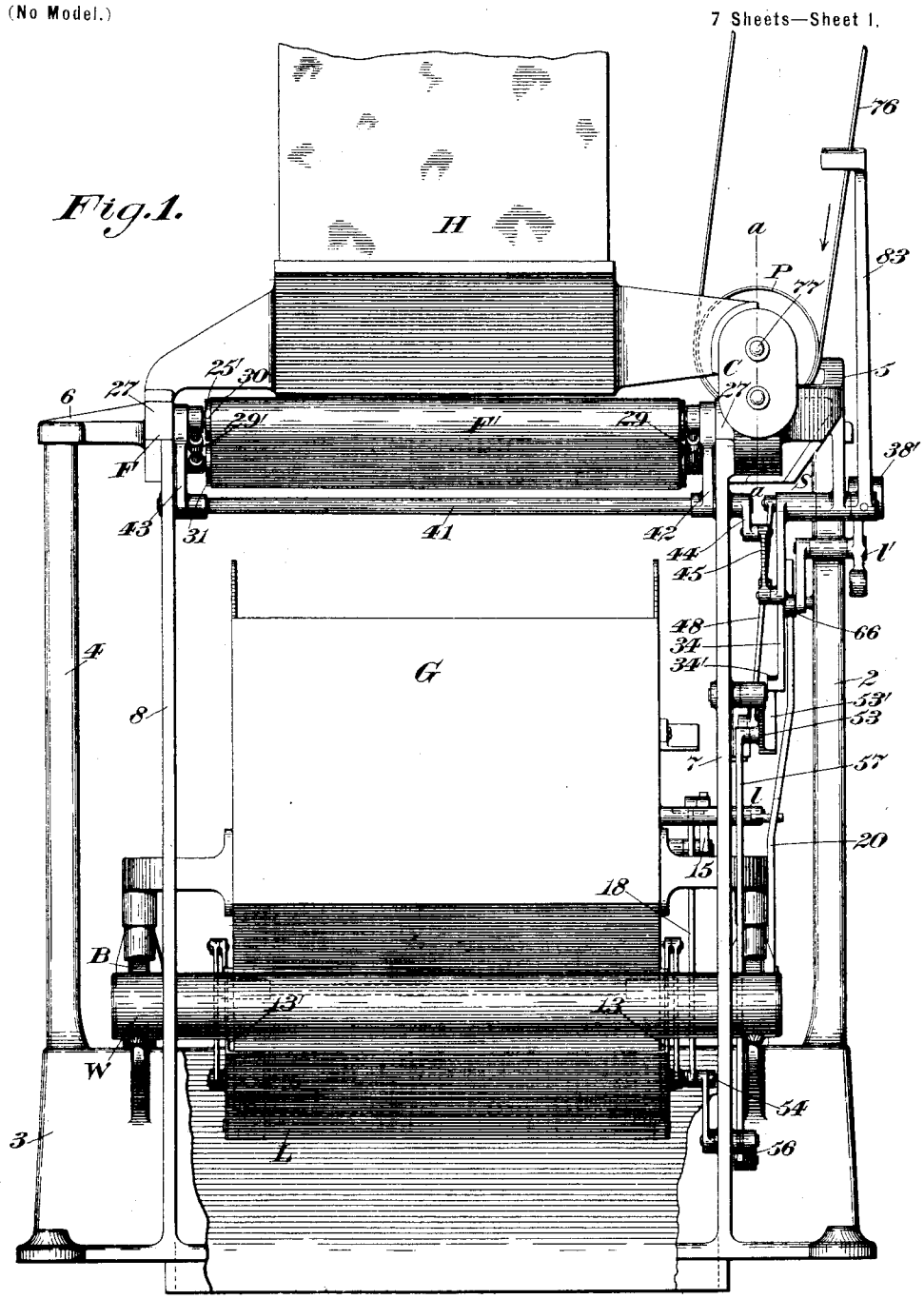

No. 607,478. Patented July 19, 1898.
F. H. RICHARDS.
WEIGHING MACHINE.
(Application filed Nov. 5, 1897.)

(No Model.) 7 Sheets—Sheet 1.

Witnesses:
Chas. D. King.
Fred. J. Dole.

Inventor:
F. H. Richards.

No. 607,478. Patented July 19, 1898.
F. H. RICHARDS.
WEIGHING MACHINE.
(Application filed Nov. 5, 1897.)
(No Model.) 7 Sheets—Sheet 2.
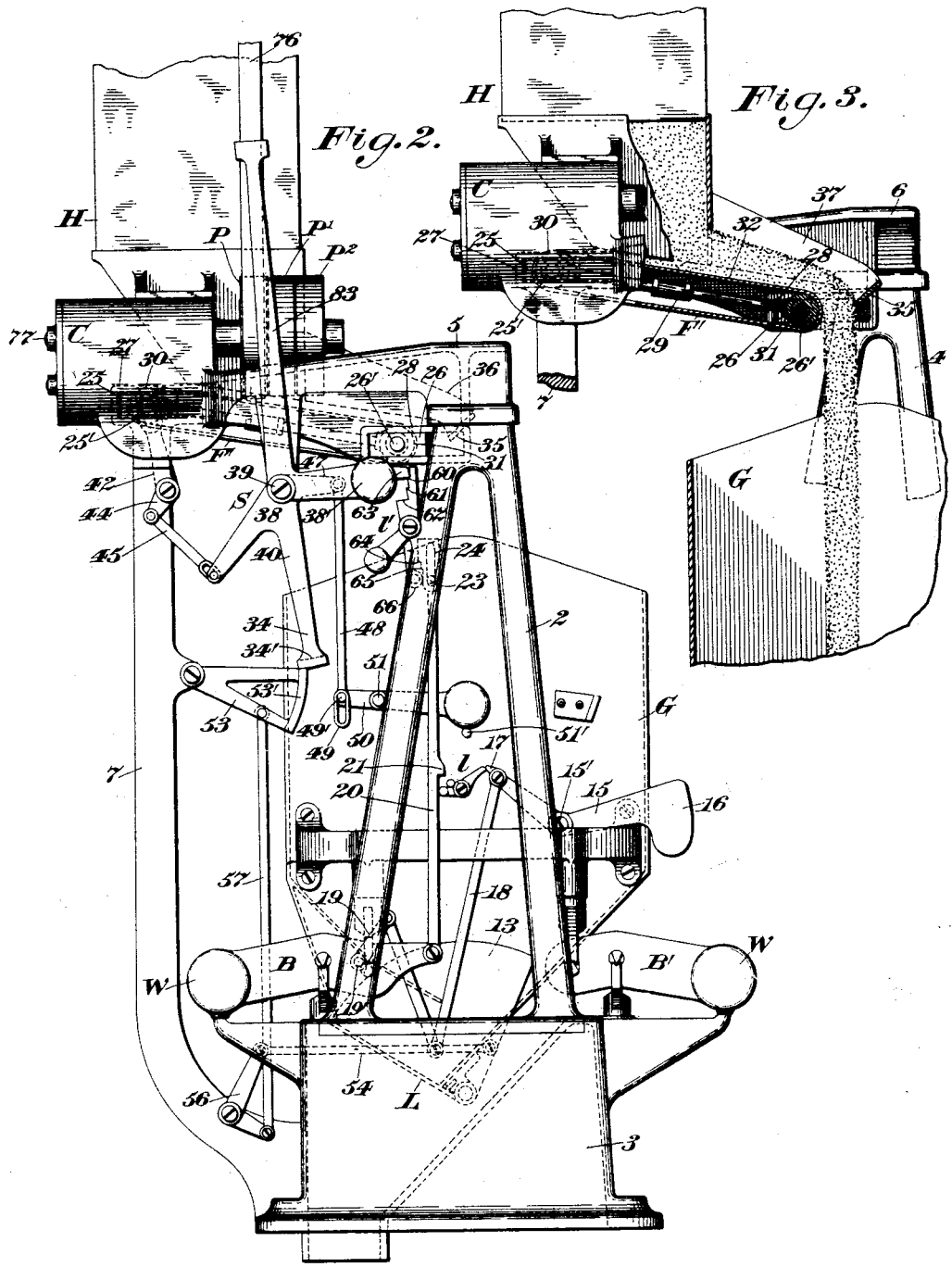
Witnesses:
Chas. D. King,
Fred. J. Dole.
Inventor:
F. H. Richards.

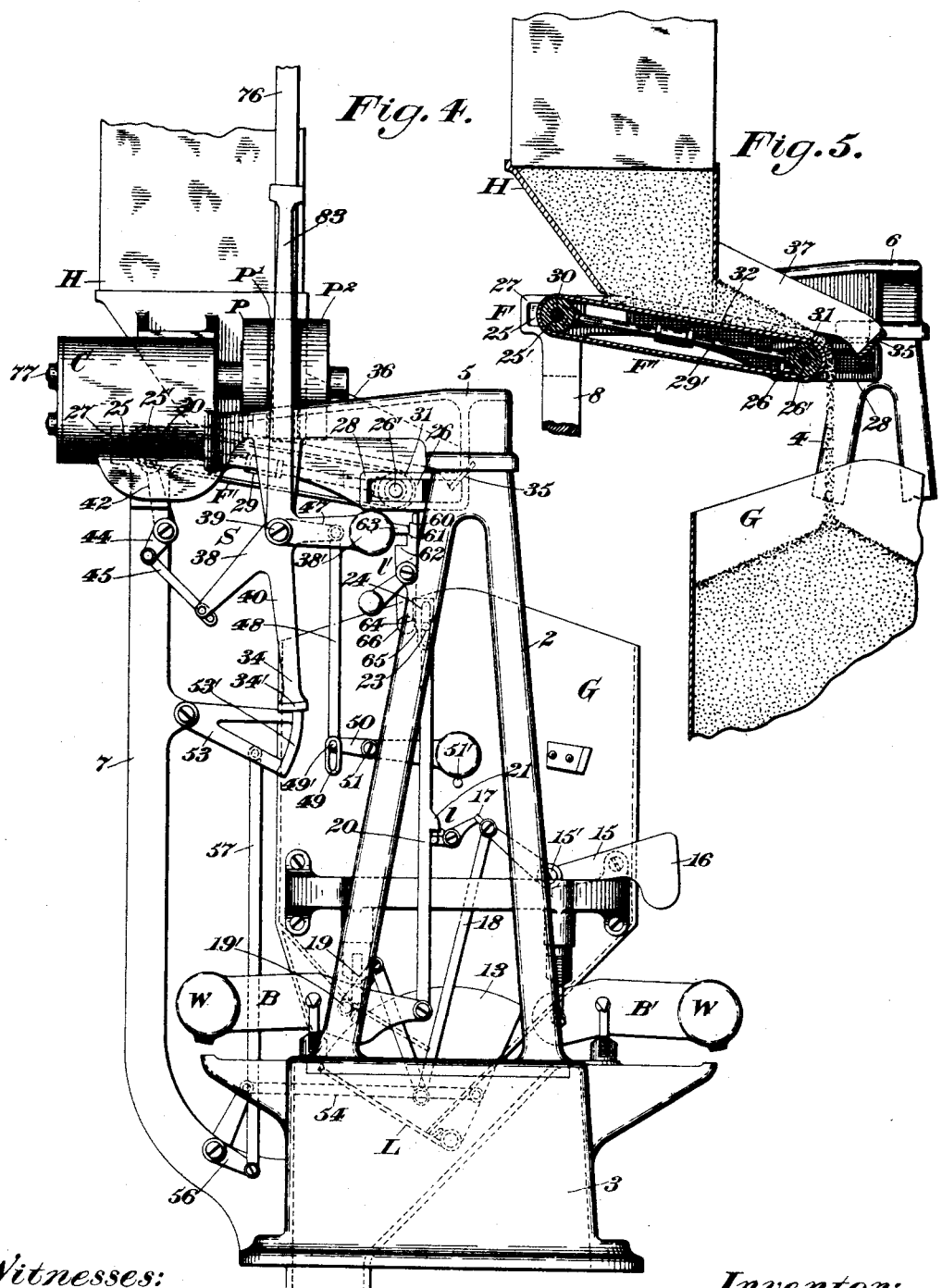

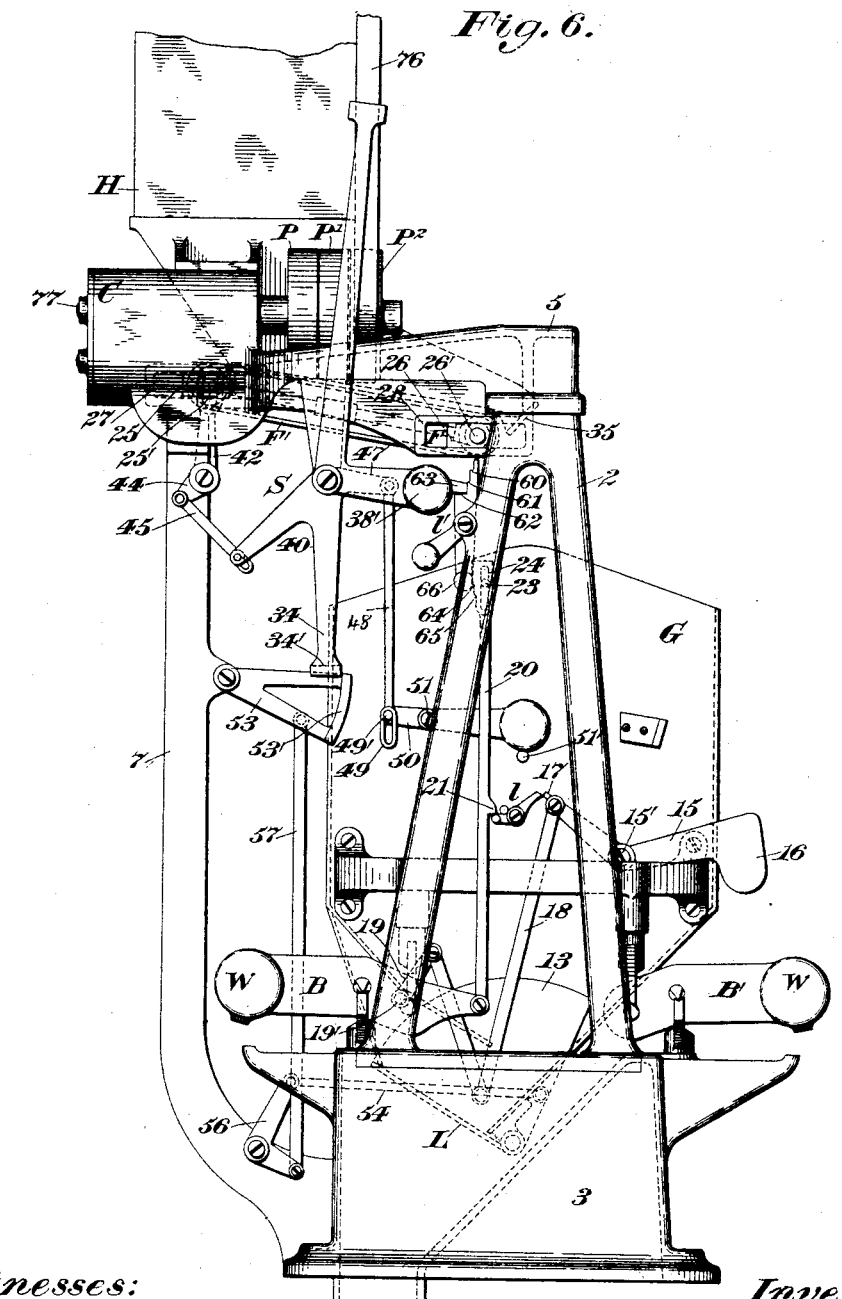

No. 607,478. Patented July 19, 1898.
F. H. RICHARDS.
WEIGHING MACHINE.
(Application filed Nov. 5, 1897.)
(No Model.) 7 Sheets—Sheet 5.
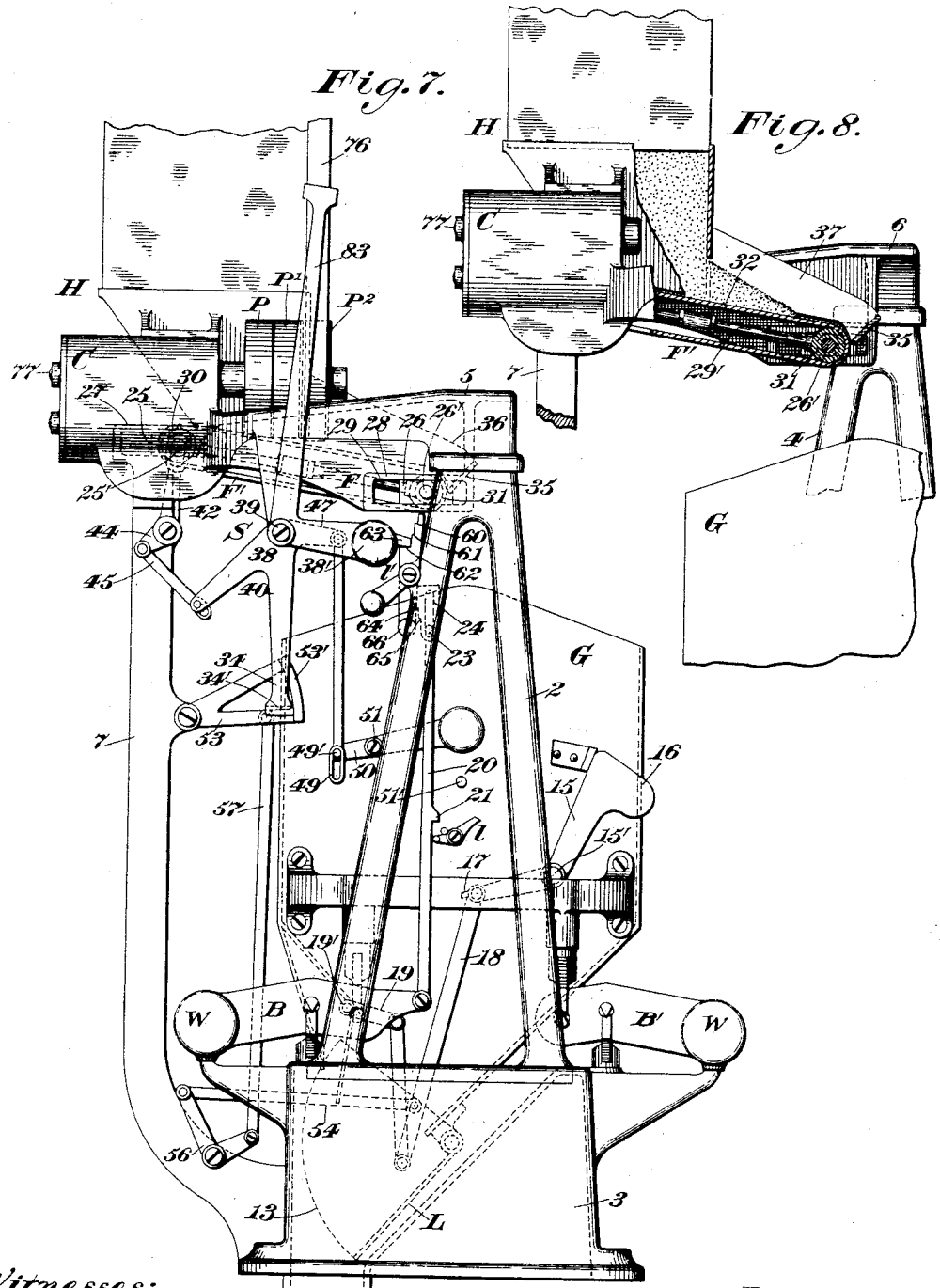
Witnesses:
Chas. D. King,
Fred. J. Dole.
Inventor:
F. H. Richards.

No. 607,478.

F. H. RICHARDS.
WEIGHING MACHINE.
(Application filed Nov. 5, 1897.)

Patented July 19, 1898.

(No Model.)

7 Sheets—Sheet 6.

Witnesses:
Chas. D. King,
Fred. J. Dole.

Inventor:
F. H. Richards,

No. 607,478. Patented July 19, 1898.
F. H. RICHARDS.
WEIGHING MACHINE.
(Application filed Nov. 5, 1897.)
(No Model.) 7 Sheets—Sheet 7.
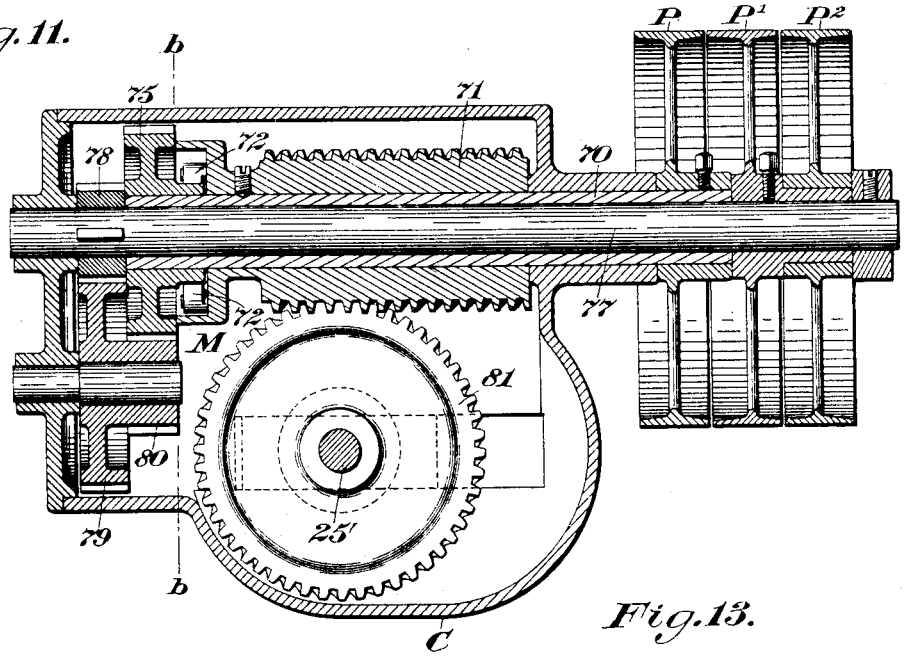
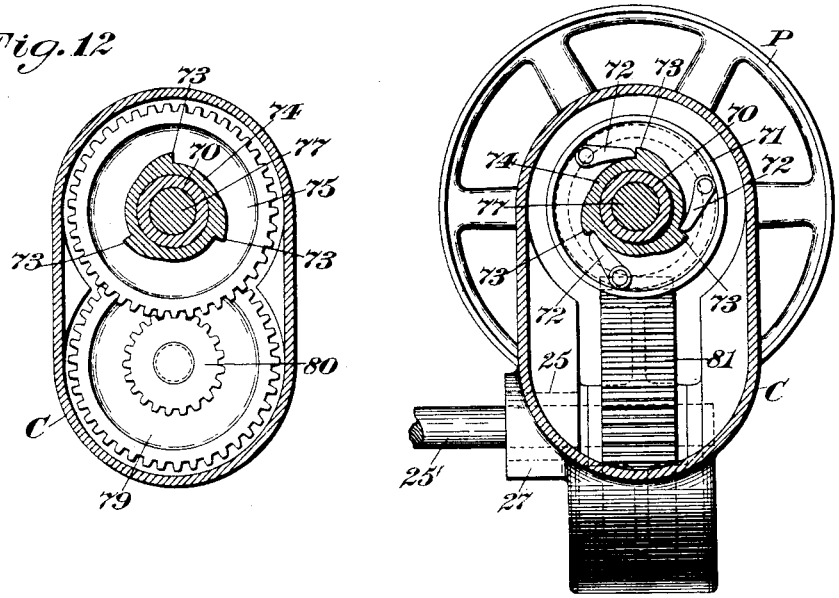
Witnesses:
Chas. D. King.
Fred. J. Dole.
Inventor:
F. H. Richards.
THE NORRIS PETERS CO., PHOTO-LITHO., WASHINGTON, D. C.

UNITED STATES PATENT-OFFICE.

FRANCIS H. RICHARDS, OF HARTFORD, CONNECTICUT.

WEIGHING-MACHINE.

SPECIFICATION forming part of Letters Patent No. 607,478, dated July 19, 1898.

Application filed November 5, 1897. Serial No. 657,520. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to an automatic weighing-machine of that class in which a power-driven feeder is provided in operative relation with the supply-hopper for advancing or force-feeding the mass of material deposited thereon and for discharging the same in a continuous stream of proper volume to the load-receiver, as described, for instance, in Letters Patent of the United States No. 579,446, granted to me March 23, 1897.

One object of my present invention is to provide, in connection with stream-supplying means of a weighing-machine, improved stream feeding and controlling instrumentalities, including a feeder-carrier supported for advancing and retracting movements in a plane crosswise of the path of the stream, an endless-band feeder supported on said carrier for circuitous movements in a plane intersecting the path of movement of the carrier, and differential-speed feeder-driving mechanism in connection with and effective for imparting material-advancing movements of relatively different velocities to the feeder at predetermined points, respectively, in the movements of the weighing mechanism.

A further object of my present invention is to provide, in connection with the supply-hopper of a weighing-machine, an improved stream-controller supported for horizontal reciprocatory movements below said hopper and having an endless-band feeder supported thereon for reciprocatory movements bodily with the stream-controller and for independent circuitous movement; means controlled by the weighing mechanism for imparting a step-by-step advancing movement to the stream-controller to regulate the volume of the stream discharged from the load-receiver, and feeder-actuating mechanism controlled by the weighing mechanism and effective for rotating the feeder at successively different velocities concurrently with successive step-by-step movements of the stream-controller.

A further object of the invention is to provide, in connection with an automatic weighing-machine, improved load-discharging mechanism and improved instrumentalities in connection therewith for governing the operation of the stream-controlling instrumentalities.

A further object of my present invention is to provide, in connection with an endless feeder of a weighing-machine, improved differential-speed actuating mechanism, including a primary and a secondary driving member having coincident axes of rotation; a rotary power-transmitter in operative connection with the feeder and primary driving member; a differential train of gears independent of the power-transmitter and embodying a clutch operative on the rotation of one of the driving members for coupling the two driving members together, and means controlled by the weighing mechanism for rotating first one and then the other driving member to change the velocity of the feeder at different points in the movements of the weighing mechanism.

Figure 9:
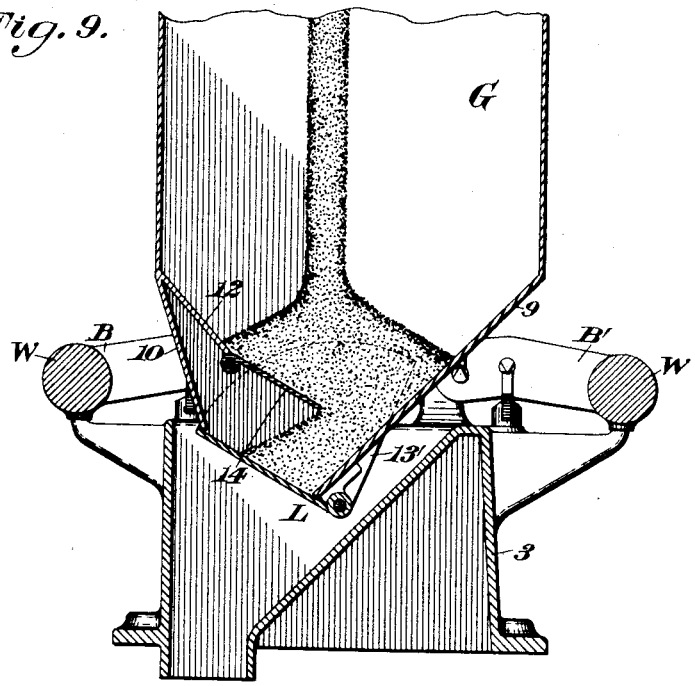
Figure 10:
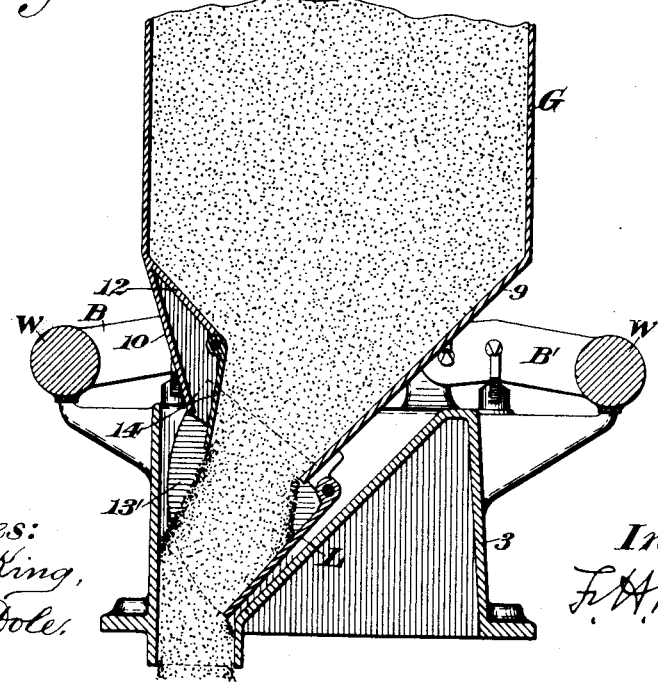

In the drawings accompanying and forming part of this specification, Figure 1 is a rear elevation of a weighing-machine as seen from the left in Fig. 2, a portion of the base of the machine being broken away. Fig. 2 is a side elevation of the weighing-machine as seen from the right in Fig. 1 and showing the parts in the positions they occupy when the material-feeder is running at a maximum velocity and a stream of relatively large volume is being fed to the load-receiver, the stream-controller being shown in dotted lines and in its fully-retracted position. Fig. 3 is a side elevation, partially in section, of a portion of the upper part of the machine, showing the stream-controller in the position it occupies when the parts of the weighing mechanism are in the positions shown in Fig. 2 and also indicating the size of the supply-stream as it is fed along and over the discharge end of the feeder. Fig. 4 is a side elevation, similar to Fig. 2, of the weighing-machine, showing the parts thereof in the positions they occupy when the stream-controller is in position for supplying a drip-stream to the load-receiver, the material-feeder, when in this position, being driven at its minimum velocity. Fig. 5 is a vertical section similar to Fig. 3, showing the same parts in the positions thereof illustrated in Fig. 4, said figure showing the feeder in its intermediate or drip-supplying position and also illustrating the size of the stream discharged to the load-receiver. Fig. 6 is a side elevation similar to Fig. 4, showing the weighing mechanism in its poised position the stream-controller in its extreme advanced or cut-off position, and the remaining parts of the weighing mechanism in the positions they occupy just preparatory to the discharge of the load. Fig. 7 is a side elevation similar to Fig. 4, showing the parts of the weighing-machine in the positions they occupy when the feeder-actuating mechanism has been stopped and the closer or load-discharger of the load-receiver is in its open load-discharging position. Fig. 8 is a side elevation, partially in section, of the upper part of the weighing-machine, showing the stream-controller in its extreme advanced or cut-off position. Figs. 9 and 10 are vertical sections of a portion of the lower part of the weighing-machine, showing the load-discharger in closed and open positions, respectively. Fig. 11 is a vertical section, on a relatively large scale, taken on the line corresponding with the line $a\,a$, Fig. 1, of the differential-speed feeder-actuating mechanism. Fig. 12 is a vertical cross-section of the feeder-actuating mechanism, taken on the dotted line $b\,b$, Fig. 11, and showing the parts at the left of said line; and Fig. 13 is a similar cross-sectional view of the feeder-actuating mechanism, taken on the dotted line $b\,b$, Fig. 11, and showing the parts at the right of said line.

Similar characters designate like parts in all the figures of the drawings.

The framework for supporting the several fixed and operative parts of the weighing-machine may be of any suitable general construction and comprises, in the form thereof shown in the accompanying drawings, the main frame, including the chambered supporting-base 3, two vertical side standards 2 and 4, supported on the chambered base 3, and a top frame, including two substantially parallel horizontal beams 5 and 6, respectively supported at their inner ends upon the upper ends of the side standards and supported at their outer ends upon the upper ends of the uprights 7 and 8, which are in turn supported at their lower ends upon the base 3, one of said side beams, as 5, having a gear-casing (designated in a general way by C) formed, preferably, integral therewith.

The main supply-hopper H of the weighing-machine, which hopper may be of any suitable general construction, is shown supported in a suitable manner by the top frame. The lower edges of the side walls of the supply-hopper are shown inclined downwardly toward the forward edge thereof, and the front wall of said hopper is shown cut away at the lower end to form an outlet for the supply-stream.

The weighing mechanism comprises a load-receiver or bucket and supporting-beam mechanism therefor, such elements being in the present instance substantially of the same general construction, organization, and mode of operation as similar elements described in Letters Patent of the United States No. 548,840, granted to me October 29, 1895, to which reference may be had.

Inasmuch as the construction and organization of the framework, the load-receiver, and the beam mechanism for supporting said load-receiver may be variously modified within the purview of this invention and as my present improvements may be employed in connection with a weighing mechanism of different construction and organization from that shown in the accompanying drawings, a brief description of the construction and organization of these elements is deemed sufficient for an understanding of this invention, reference being had to the Patent No. 548,840, referred to for a more detailed description thereof.

The bucket, which is designated in a general way by G, is pivotally supported on suitable knife-edges on the poising ends of the scale-beams B and B', which in turn are mounted in a similar manner on the base 3 of the framework, said beams B and B' each consisting of two parallel arms located one at each side of the load-receiver and connected by a counterweight W.

The lower portions of the front and rear walls 9 and 10 of the load-receiver are inclined downwardly toward each other. The inclined portion 10 has its inner end terminated substantially midway between the two vertical side walls, or somewhat in the rear of the vertical central line of said receiver. The receiver is shown furnished at a point above the extreme lower end thereof with an inwardly-projecting deflecting-plate 12, which plate is inclined downwardly toward the forward end thereof and terminates at a point above and somewhat in advance of the lower extreme edge of the rear inclined wall 10 of the load-receiver.

The load-discharger for the load-receiver comprises, in the preferred form thereof shown most clearly in Figs. 2, 9, and 10 of the drawings, a closer, (designated in a general way by L,) shown as a flat closer-plate pivotally supported at the forward end thereof in suitable brackets secured to the lower end of the inclined bottom portion 10 of the front wall of the load-receiver and having guard-flanges 13 and 13' for preventing an overflow of and for guiding the material as it is discharged from the load-receiver, and a material-sustaining wall 14, pivotally supported at one end on the extreme inner end of the deflecting-plate 12 and adapted, when the closer L is in the position shown in Fig. 9, to constitute an extension of said deflecting-plate, the forward end of the sustaining-plate, when said plate is in its load-supporting position thereof, (shown in Fig. 9,) terminating at a point above and substantially in vertical alinement with the axis of the closer-plate and with the extreme inner edge of the inclined portion 10 of the front wall of the load-receiver. These plates 12 and 14, it will be observed by reference to Fig. 9, sustain the weight of the major portion of the load and materially reduce the stress which would otherwise be exerted upon the closer and correspondingly reduce the frictional resistance between the closer sustaining and interlocking instrumentalities, which instrumentalities will be hereinafter fully described.

As a convenient means for imparting a closing movement to the closer L after the load has been discharged from the load-receiver I have provided in connection therewith a closer-shutting actuator which, in the preferred form thereof shown in the accompanying drawings, comprehends an actuating-lever 15, fulcrumed at 15' on the load-receiver and having at the forward end thereof a weight 16 and having at the opposite end thereof a catch 17, which when the closer L is shut and the lever 15 is in the position shown in Fig. 2 engages the forward end of a closer-latch $l$, which normally locks the lever against a closer-opening movement. This lever is operatively connected with the closer by a link 18, which is pivotally connected at its upper end to the inner rear end of the lever and is pivotally connected at its lower end to the closer at a point between the extreme rear discharge end of the closer-plate and the pivotal point thereof, and as a means for actuating the load-sustaining plate 14 concurrently with the opening and closing movements of the closer I have provided an actuating-connector between the closer L and plate 14, which, in the preferred form thereof shown in the accompanying drawings, comprises a crank-arm 19, fixed to the pivot 19' of the load-sustaining plate 14, and a link pivotally connected at its upper end to the inner end of the crank-arm and at its lower end to the closer L at a point substantially coincident with the point of connection of the link 18 with said closer.

As a means for actuating the latch $l$ at a predetermined point in the movements of the load-receiver I have provided, in connection with the beam mechanism, a vertically-disposed latch-tripper which, in the form shown in the accompanying drawings, is in the nature of a rod 20, pivotally connected at its lower end to the poising end of one of the arms of the scale-beam and having a latch-tripping projection 21 intermediate its ends in position for engaging the latch $l$ to release said latch at a predetermined point in the descending movement of the load-receiver. This latch-tripper is guided in its vertical movements, preferably, by a pin or projection 23 on the load-receiver extending through an elongated slot 24 in the upper end of the latch-tripper 20.

For the purpose of preventing an opening movement of the closer L until the supply of material to the load-receiver is cut off should the closer-latch $l$ be accidentally tripped I have provided interlocking mechanism between the stream-controller actuator and the closer L, the construction, organization, and operation of which will be hereinafter described.

As a convenient means for governing the discharge of material from the supply-hopper and for controlling the feed of the supply-stream supplied to the load-receiver I have provided, in coöperative relation with the stream-supplying means or supply-hopper H, a stream-controlling device which, in the preferred form thereof shown most clearly in Figs. 2 and 5 of the drawings, comprises a feeder-carrier which is supported for reciprocatory movements in a horizontal plane below the discharge end of the supply-hopper and a material-advancing feeder supported on said carrier for material-advancing movements independent of the horizontal movements of the carrier.

The feeder-carrier, which is designated in a general way by F, comprises two pairs of slide-blocks 25 and 26, respectively, supported one pair preferably above the other for reciprocatory movements in guideways 27 and 28 on the top frame of the machine, the slide-blocks of each pair being connected together by rods or shafts 25' and 26', respectively, and which shafts 25' and 26' are adjustably connected to each other, at opposite ends thereof, by adjusting devices, herein shown as turnbuckles 29 and 29', and mounted upon the two shafts 25' and 26' are feed-supporting rolls 30 and 31, respectively, the former of which will preferably be secured to the shaft 25' and constitutes the driving-roll for the feeder.

The feeder, which is designated by F', is shown as an endless band or belt extending around the two rolls 30 and 31, the upper run 32 of said band being obliquely disposed with respect to the horizontal plane and extending across the discharge end of the supply-hopper, the forward end of the upper run being located somewhat in advance of and below the forward wall of the supply-hopper and above the receiving end of the load-receiver, and the rear end of said upper run being located somewhat in the rear of and below the lower end of the rear wall of the supply-hopper.

By the construction and organization of stream-controller hereinbefore described it will be seen that the feeder-carrier may have an advancing and retracting movement in a horizontal plane crosswise of the discharge end of the supply-hopper, that the upper run of the endless-band feeder may have a material-advancing movement in a plane oblique to and intersecting the plane of movement of the feeder-carrier, and, furthermore, that during the advancing movement of the feeder-carrier the material-carrying run of the feeder will be brought into closer relation with the discharge end of the supply-hopper, thereby reducing the area of the space between the said run and the discharge end of the hopper and decreasing the thickness of the mass passing from the hopper onto the upper run of the feeder.

For the purpose of positively preventing the discharge of material from the feeder to the load-receiver after the material-advancing movement of the feeder is arrested and the load-receiver has arrived at its true poised position, which discharge of material might be occasioned by the momentum acquired by said material during the advancing movement of the feeder, I have provided, in operative relation with the discharge end of the feeder, a cut-off plate 35, extending transversely of the path of feed movement of said feeder, which cut-off plate is supported at opposite ends between guard-rails 36 and 37, secured to and extending forward from the supply-hopper. This cut-off plate is shown vertically disposed and inclined from its upper end downwardly toward the forward end of the feeder, the lower edge of said plate terminating at a point somewhat below the upper run of said feeder and in position to obstruct the passage of material between the stream-controller and said plate when said controller is in its extreme advanced or cut-off position, as illustrated in Fig. 8 of the drawings.

As a means for actuating the stream-controller to advance the same intermittently or with a step-by-step movement first from its fully-retracted position to an intermediate or "drip" position and then to an extreme advanced or "cut-off" position and for concurrently imparting circuitous or "material-feeding" movements of different velocities to the endless-band feeder of said controller, as required by and according to the positions of the stream-controller, I have provided, in operative connection with said stream-controller, a compound feeder-actuating mechanism comprehending two actuators, (designated in a general way by M and S, respectively,) the one, M, of which is controlled by the one, S, and is effective for imparting circuitous movement to said feeder, as will be hereinafter described, and the other, S, of which is effective for shifting the feeder bodily crosswise of the path of the stream. The actuator S, which is adapted for controlling the stream-reducing movements of the feeder, comprises, in the preferred form thereof shown in the accompanying drawings, a gravitative device (shown as an actuating-lever 58) fulcrumed at 39 on a hanger depending from the top frame of the machine and having a stop-arm 40 projecting downward therefrom and also having a weight 38' at one end for normally exerting a controller-advancing stress on said lever; a rock-shaft 41, (see Fig. 1,) journaled in suitable bearings at the upper ends of the uprights 7 and 8 and having upwardly-extending crank-arms 42 and 43, respectively, at opposite ends thereof, whose upper ends are bifurcated and straddle opposite ends of the connecting-shaft 25' of the stream-controller slides; an oppositely-disposed crank-arm 44, fixed to one end of the rock-shaft 41, and a link 45, pivotally connected at one end to the outer end of said crank-arm and having its opposite end pivotally connected to the rear arm of the actuating-lever 38.

As a means for imparting a controller-retracting movement to the controller-actuator I have provided, in operative connection with said actuator, a crank-arm 47, (shown in dotted lines in Figs. 2, 4, 6, and 7,) to the forward end of which is pivotally connected a depending link 48, having a loop 49 at the lower end thereof which straddles a pin 49' at one end of a weighted lever 50, fulcrumed at 51 on the load-receiver intermediate the pin 49' and the weighted end of said lever.

The operation of the controller-retracting lever 50 and its connections with the stream-controller is substantially the same as the valve-retracting actuator in the weighing-machine described in Patent No. 548,840, hereinbefore referred to, said lever being shifted from the position shown in Fig. 2 to the position shown in Fig. 7 by means of an abutment 51' on the load-receiver engaging and elevating the weighted end of said lever during the ascending movement of said load-receiver, the opposite end of said lever 50 being normally blocked against ascending movement by the link 48 and the interlocking instrumentalities between the controller-actuator and closer, thus allowing the weighted end of the lever to be elevated and held in an elevated position until the interlocking instrumentalities are thrown to a position for unlocking and permitting a controller-retracting movement of the actuator-lever 38, to which said link 48 is connected.

The interlocking instrumentalities for blocking the retractive movement of the stream-controller when the closer is in its open position and for blocking the closer against opening movement when the stream-controller is in its retractive position consists of the stop-arm 34, carried by the controller-actuating lever 38 and having a flange 34' at the lower end thereof; a stop member 53, pivotally supported on the framework of the machine and having a flange 53' in position for coöperating with the flange 34' on the stop member 34; a link 57, pivotally connected at its upper end to the stop member 53 and pivotally connected at its lower end to the inner end of a bell-crank or angle lever 56, fulcrumed on the framework at one side of the base of the machine, and a link 54, pivotally connected at the rear end thereof to the opposite arm of the bell-crank lever 56 and at its opposite end to the closer L, as shown in the accompanying drawings. The disposition of the bell-crank lever 56, link 57, and stop-member-actuating link 54 is such that when the closer is in the closed position, as shown in Fig. 2, the upper end of the flange 53' of the stop member 54 will engage the stop-face of the flange 34' on the stop-arm 34 and prevent an opening movement of said closer, and when the closer is in its open position, as shown in Fig. 7, the forward end of the flange 34' on the stop-arm 34 will bear against the inner face of the flange 53' of the stop member 53 and prevent a retractive movement of the stream-controller.

When the stream-controller is in its fully-advanced position and the closer L is in its open position, as shown in Fig. 7, the controller-retracting lever 50 will be located in position to impart a retractive movement to the controller immediately upon the return of the closer to its shut position and on the release of the stop-arm 34 from the stop member 53 by such closing movement. Immediately upon the return of the closer to its fully-closed position the controller-actuator lever 38 will be shifted from the position shown in Fig. 7 to that shown in Fig. 2 through the medium of the lever 50, which drops from the position thereof shown in Fig. 7 to that shown in Fig. 2, the weight of said lever being of sufficient magnitude to overcome the resistance of the weighted lever 38 and connected parts.

As a convenient means for effecting a step-by-step movement of the controller and for arresting the same intermittingly at successive points in its closing movements I have provided in operative relation with the weighted end of the lever 38 a latch $l'$, fulcrumed on the framework and having at the upper end thereof three stop abutments or catches, which are designated by 60, 61, and 62, respectively, and are shiftable into position for successively engaging a projection 63 on the forward weighted end of said lever, said latch having a weighted arm for normally retaining the catches in position for engaging said projection. This latch is shifted on its axis to successive positions for releasing the successive catches from the projection on said lever by means of cam-faces 64 and 65 on the upper end of the closer-latch actuator, which successively engage, during the descending movement of the load-receiver, a roll or projection 66 on a depending arm of the controller-governing latch $l'$, the cams of the closer-actuating rod being so constructed as to shift the latch intermittingly, so as to release first one catch, as 60, from engagement with the projection 63 and then the next catch, as 61, from said projection. The range of movement of the weighted end of the lever 38 at each successive step being sufficient and the connections between said lever and the stream-controller being such that when the lever gravitates from the position shown in Fig. 2 to that shown in Fig. 4 the stream-controller will be shifted from its fully-retracted position to its intermediate or drip position, and when said lever is released from the catch 61 and drops to the catch 62 the stream-controller will be shifted from its intermediate or drip position to its extreme forward or cut-off position.

For the purpose of imparting to the feeder F' a circuitous material-advancing movement of relatively-varying velocities according to the requirements as indicated by the position of the load-receiver relative to its true poising position I have provided in operative connection with the feeder differential-speed feeder-actuating mechanism (designated in a general way by M) comprehending means controlled by the weighing mechanism for imparting to said feeder a maximum velocity when the controller or feeder-carrier is in its fully-retracted position and the weighing mechanism is in its normal position, for imparting to said feeder a minimum velocity when the controller is in its intermediate or drip position and the load-receiver has arrived in close proximity to its poised position, and for stopping said feeder and imparting a short retractive movement thereto when the stream-controller is in its extreme advanced position and the load-receiver has arrived at its truly-poised position.

The differential-speed actuating mechanism for the feeder is so constructed and organized relatively to the feeder and its carrier that on successive advancing movements of the said carrier or stream-controller successively-decreased velocities will be imparted to the feeder, the feeder-actuating mechanism in connection with said feeder serving to supply a large volume of material to the load-receiver during the first part of the weighing operation and for decreasing this volume as the weighing mechanism approaches its poised position and for completely cutting off the supply on the arrival of said weighing mechanism at its truly-poised position.

The differential-speed feeder-actuating mechanism, in the preferred form thereof shown most clearly in Figs. 11 to 13 of the drawings, comprises a primary and a secondary driving member operatively connected together by a train of speed-reducing gears including a clutch device operative on the rotation of one driving member for coupling the same to and for rotating the other driving member, independent means controlled by the weighing mechanism for rotating the two driving members independently or successively, and a rotative power-transmitter or driven member coöperatively connecting the feeder with the primary driving member.

The primary driver comprises, in the form thereof shown in Figs. 11 and 13, a tubular driving shaft or member 70, journaled at one end in a bearing in the gear-casing C, a worm 71, fixed to said tubular shaft within the casing C and having at one end thereof one member of a clutch device, herein shown as a series of pivotally-supported pawls 72, in position for engaging the teeth 73 of a ratchet 74 on the hub of a spur-wheel 75, loosely mounted upon the inner end of the tubular shaft 70, the pawls being so disposed that when the said shaft or driving member 70 is rotated the pawls will freely ride over the teeth of the ratchet that constitutes the other member of the clutch.

The secondary driver, in the form thereof shown most clearly in Figs. 11 and 12, comprises a primary driving member 77, shown as a shaft, extended through and journaled for rotation in the tubular driving member 70 and having fixed to the inner end thereof a pinion 78 of less diameter than the spur-wheel 75 and two preferably integral differential gears 79 and 80 of different diameters, mounted on a stud journaled in the casing below and parallel with the shaft 77, which gears 79 and 80 mesh with the pinion 78 and spur-wheel 75, respectively. The gears 75, 78, 79, and 80 constitute a differential train connecting the two driving members 70 and 77.

The power-transmitter or driven member is shown as a worm-wheel 81, which is fixed to the shaft 25' of the feeder-driving roll 30 and meshes with the worm 71 and is also movable with the stream-controller transversely of its axis of rotation and in parallelism with the axis of the driving member 70.

As a means for rotating the primary and secondary drivers independently and successively and for stopping the rotation of said drivers intermittingly I have provided in operative relation therewith a series of pulleys, (designated by P, P', and P², respectively,) the one P of which is fixed to the outer end of the primary driving member 70, the one P' of which is fixed to the outer end of the secondary driving member 77, and the one P² of which is loosely mounted upon the extended hub of the pulley P'. These pulleys are rotated in proper order by means of a belt 76, which may be driven from any suitable source of power and which is shiftable from one to the other pulley, and as a means for intermittingly shifting the belt from one to another pulley, as required, to impart differential speeds to the feeder at the requisite stages in the weighing operation I have provided a belt-shifter 83, shown as a belt-shifting lever, fixedly secured at its lower end to the shaft of the controller-actuating lever 38 in such manner that when the controller-actuating lever is shifted from the position shown in Fig. 7 to that shown in Fig. 2 the belt-shifter will shift the belt from the loose pulley P² to the pulley P, fixed to the primary or high-speed driving member, and when said lever is shifted successively to the positions shown in Figs. 4 and 6 the belt-shifter will first shift the belt from the pulley P to the pulley P', fixed to the low-speed driving member, and then to the loose pulley P².

It will be apparent that when the belt 76 is driving the pulley P a material-advancing movement of maximum velocity will be imparted to the feeder F', at which time the feeder-carrier will be in its fully-retracted position and the discharge end of the feeder will be most remote from the cut-off plate, thus causing the feeder to supply a large volume to the load-receiver in a short space of time. When the belt is driving the pulley P', the feeder will be in its drip position, and a material-advancing movement of minimum velocity will be imparted thereto for delivering a drip stream to the load-receiver, which receiver is at this time in close proximity to its poised position.

On the arrival of the load-receiver at its truly-poised position the belt 76 will be automatically shifted from the pulley P' to the loose pulley P² through the medium of the actuator 38, which controls the movement of the belt-shifter, thereby first stopping the rotation of the driving-worm and power-transmitter, and then on the continued advancing movement of the feeder-carrier causing the power-transmitter to be partially rotated in a reverse direction, consequently reversing the direction of movement of the upper run of the feeder. The ratio of movement between the belt-shifter and stream-controller will be such in practice that the stream-controller will have a short advancing movement after the belt 76 has been shifted onto the loose pulley, so that a slight retractive movement will be imparted to the upper run of the belt for the purpose of retracting the material after the feed movement of the belt has been arrested and preventing the overshooting of that portion of the material near the discharge end of the feeder, which might be caused by the momentum acquired by the material during the advancing movement of the upper run of the feeder.

It will be obvious that the advancing movement of the feeder-carrier and the circuitous movement of the feeder might be arrested simultaneously. By reference to Fig. 11 it will be understood that when the rotation of the worm of the primary driver is arrested by the shifting of the belt onto the loose pulley a transverse movement of the worm-wheel or driven member in the plane of the axis of said worm will cause said worm-wheel to be rotated a short distance in a direction opposite to that in which it is normally rotated, the stationary worm then acting as a rack to cause said worm-wheel to rotate in this direction.

By reference to Fig. 11 it will be seen that when the belt 76 is rotating the primary driver the power-transmitter will be rotated at its maximum speed and that when the belt is shifted to the pulley P' and is rotating the secondary driver the primary driver, the power-transmitter, and the feeder-actuating roll 25' will be rotated through the medium of the speed-reducing train at a minimum velocity.

Having described my invention, I claim—

1. The combination, with weighing mechanism including a reciprocatory load-receiver and with a supply-hopper, of an endless-band feeder supported below said hopper; a feeder-actuator controlled by the weighing mechanism, and operable at successive points in the movements of the load-receiver for imparting a step-by-step advancing movement, bodily, to the feeder; and power-actuated differential driving mechanism in operative connection with said feeder and including means controlled by the feeder-actuator for varying the velocity of circuitous movement of the feeder according to the position of said feeder.

2. The combination, with weighing mechanism including a reciprocatory load-receiver and with a supply-hopper, of a stream-controlling device coöperative with said hopper and embodying a feeder-carrier supported for horizontal movements bodily below said hopper, and an endless-band feeder supported on said carrier for circuitous material-advancing movements independent of the horizontal movements of the carrier; means controlled by the weighing mechanism, and operative at predetermined points in the movements of the load-receiver, for advancing the carrier to successive positions relatively to the hopper; and power-actuated mechanism for imparting a circuitous movement to the feeder and embodying means operative, on the arrival of the feeder at the drip position, for decreasing the velocity of said feeder, and also operative, on the arrival of said feeder at its cut-off position, for stopping said feeder.

3. The combination, with weighing mechanism including a reciprocatory load-receiver and with a supply-hopper having a cut-off plate, of an endless-band feeder supported below said hopper for movement toward and away from said cut-off plate; means controlled by the weighing mechanism at predetermined points in the descent of the load-receiver for advancing the feeder bodily toward the cut-off plate; means for arresting the feeder at successive points in its advancing movement; and power-actuated feeder-driving mechanism embodying differential-speed instrumentalities operable for varying the material-feeding velocity of the feeder concurrently with the arrival of said feeder at a predetermined point in its advancing movement toward the cut-off plate.

4. The combination, with stream-supplying means, of an endless traveling feeder coöperative therewith; means for imparting a cut-off movement to the feeder in a plane crosswise to the path of the supply-stream; and driving mechanism for the feeder, including means controlled by the feeder on the cut-off movement thereof for reversing the direction of traveling movement of said feeder.

5. The combination with stream-supplying means, of a stream-controller coöperative therewith and including an endless-band feeder, means for shifting the stream-controller crosswise of the path of the supply-stream, to cut off the supply; and feeder-actuating mechanism including means for imparting a material-advancing movement to the feeder in addition to means operative on the cut-off movement of the controller for imparting a material-retracting movement to the feeder.

6. The combination, with a supply-hopper, of a stream-controller including an endless, traveling material-feeder; means for imparting advancing and retracting movements to the stream-controller crosswise of the discharge end of the hopper; and feeder-actuating mechanism including reversing driving instrumentalities effective on the retracting and advancing movements of the stream-controller for imparting material-advancing and material-retracting movements, respectively, to the feeder to control the volume of the stream discharged by said feeder.

7. The combination, with stream-supplying means, of a stream-controller coöperative therewith and including a shiftable feeder-carrier and an endless traveling feeder; means for retracting and advancing the carrier across the path of the supply-stream, to increase and decrease the volume of the stream discharged by the feeder; and coöperative actuating mechanism for advancing and retracting the material-carrying run of the feeder simultaneously with the retracting and advancing movements of the feeder-carrier.

8. The combination, with weighing mechanism including a load-receiver and with stream-supplying means supported above said load-receiver, of a stream-controller coöperative with the stream-supplying means and including an endless traveling feeder; means controlled by the weighing mechanism for retracting and advancing the feeder bodily across the path of the supply-stream, to increase and decrease the volume of the stream supplied to the load-receiver; and means controlled by the retracting and advancing movements of the feeder for imparting simultaneously a material-advancing and a material-retracting movement to the material-supporting run of the feeder.

9. The combination, with stream-supplying means, of an endless-band feeder supported in coöperative relation with the supply means for differential movement, and two coöperative actuating devices one of which is controlled by the other, and one of which is effective for imparting a stream-controlling movement bodily to said feeder, and the other of which is effective for imparting a circuitous movement to said feeder, of different velocities, at different points in the stream-controlling movement of said feeder.

10. The combination, with weighing mechanism including a reciprocatory load-receiver and with a supply-hopper, of an endless-band feeder supported below said hopper for circuitous material-feeding movements, and also for stream-controlling movements crosswise of said hopper, and two coöperative feeder-actuating devices one of which is controlled by the weighing mechanism and is effective for imparting a step-by-step stream-controlling movement to said feeder, and the other of which is effective for imparting a circuitous movement to said feeder and embodies instrumentalities for varying the material-feeding velocity of said feeder concurrently with the arrival of said feeder at predetermined points in its stream-controlling movement.

11. The combination, with weighing mechanism including a reciprocatory load-receiver and with a supply-hopper, of an endless-band feeder supported in coöperative relation with the supply-hopper for circuitous material-advancing movements and for independent stream-controlling movements, and instrumentalities controlled by the weighing mechanism, and operable at successive points in the movements of the load-receiver, for shifting the feeder first from its fully-retracted position to an intermediate or drip position, and concurrently imparting a circuitous movement to said feeder of reduced velocity and then shifting said feeder to its fully-advanced or cut-off position and concurrently arresting the circuitous movements of said feeder.

12. The combination, with weighing mechanism including a reciprocatory load-receiver and with a supply-hopper, of an endless traveling feeder supported below said hopper for independent material-advancing and reciprocatory movements in coinciding directions but in relatively-intersecting planes, and compound actuating mechanism controlled by the weighing mechanism and including two actuators, one of which includes power-actuated differential feeder-driving devices and is effective at successive points in the movements of the load-receiver for imparting circuitous movements of varying velocities to said feeder, and the other of which is effective at such successive points in the movements of the load-receiver for shifting the feeder bodily crosswise of the supply-stream to vary the volume of material supplied to said receiver.

13. The combination, with weighing mechanism including a load-receiver and with stream-supplying means, of a stream-controller including a power-driven endless feeder; means controlled by the weighing mechanism for imparting an advancing movement to the stream-crontroller crosswise of the path of the stream; and differential feeder-driving mechanism effective at one stage in the advancing movement of the controller for reducing the material-advancing velocity of the feeder, and embodying means effective at another stage in the advancing movement of the controller for imparting a material-retracting movement to the feeder.

14. The combination, with stream-supplying means, of a stream-controller coöperative therewith and including an endless feeder; means for advancing and retracting the stream-controller in a plane intersecting the path of the supply-stream, for varying the volume of said stream; and actuating mechanism in connection with, and effective for imparting differential circuitous movements to, the feeder concurrently with the advancing and retracting movements of said stream-controller.

15. The combination, with stream-supplying means, of a stream-controller coöperative therewith and including a power-actuated feeder; means for advancing and retracting the stream-controller in a plane intersecting the path of the supply-stream, for varying the volume thereof; variable-speed driving mechanism in connection with the feeder and effective, concurrently with the advancing and retracting movements of the stream-controller, for decreasing and increasing, respectively, the material-advancing movements of said feeder, and comprehending means for imparting a material-retracting movement to said feeder at a predetermined point in the advancing movement of said stream-controller.

16. The combination, with weighing mechanism including a reciprocatory load-receiver and with a supply-hopper, of an endless-band feeder coöperative with said supply-hopper; a cut-off plate fixedly secured to the supply-hopper in advance of the discharge end of the feeder; means controlled by the weighing mechanism for shifting the stream-controller toward and away from the cut-off plate to vary the effective area of the space between the said plate and the discharge end of the feeder; and power-actuating mechanism in connection with, and effective for imparting circuitous material-advancing movements to, said feeder of relatively-varying velocities in accordance with the position of said feeder relatively to the cut-off plate.

17. The combination, with weighing mechanism including a reciprocatory load-receiver and with a supply-hopper, of a shiftably-supported stream-controller including a material-advancing endless-band feeder; a cut-off plate supported in advance of the discharge end of the feeder; means controlled by the weighing mechanism for shifting the stream-controller and its feeder bodily toward the cut-off plate, crosswise of the path of the supply-stream, whereby to decrease the size of said stream as it passes between the discharge end of the feeder and cut-off plate; and power-driven differential-speed actuating mechanism controlled by the last-mentioned means and effective for imparting circuitous material-advancing movements of predetermined velocities to the feeder during the movement of the stream-controller toward the cut-off plate.

18. The combination, with stream-supplying means, of a stream-controller coöperative therewith and including a feeder-carrier movable in a horizontal plane and a feeder supported on said carrier for material-advancing movement in a plane oblique to the plane of movement of the carrier; a cut-off plate in coöperative relation with the discharge end of the feeder; means in connection with, and effective for advancing and retracting, the feeder in a horizontal plane relatively to the cut-off plate, to vary the volume of the supply-stream; and differential-speed actuating mechanism for imparting a feed movement of high velocity to the feeder during the initial advancing movement of the carrier, for imparting a movement of decreased velocity to said feeder on the arrival of the carrier at an intermediate position, for stopping the feeder at the end of the advancing movement of said carrier, and for reëstablishing the high velocity at the end of the retractive movement of said carrier.

19. The combination, with weighing mechanism including a load-receiver and with stream-supplying means, of a stream-controller comprising a reciprocatory feeder-carrier; an endless-band feeder mounted on the carrier for independent circuitous movement; a gravitative feeder-carrier actuator controlled by the weighing mechanism for imparting a step-by-step advancing movement to the carrier crosswise of the supply-stream at predetermined points in the movements of the load-receiver; and differential-speed actuating mechanism in connection with the feeder and effective for imparting circuitous movements of relatively-different velocities to the feeder during the step-by-step advancing movement of the feeder-carrier.

20. The combination, with a supply-hopper and a supporting-frame therefor, of two pairs of slide-blocks supported in guideways on the frame, one pair in advance and the other pair in the rear of, and below, the said hopper; rolls having shafts mounted one shaft in each pair of slide-blocks; an endless-band feeder carried on said rolls; means for shifting the slide-blocks, together with the feeder, in a direction crosswise of the discharge end of the hopper, to regulate the supply; and driving mechanism in connection with one of the rolls and effective for imparting a circuitous movement to the feeder.

21. The combination, with weighing mechanism including a reciprocatory load-receiver and with a supply-hopper and a supporting-frame therefor, of a feeder-carrier supported for reciprocatory movements in guideways on the frame and including feeder-supporting rolls; an endless feeder carried on said rolls; means controlled by the weighing mechanism and operative, at predetermined points in the movements of the load-receiver, for imparting intermittent reciprocatory movements to the feeder-carrier; and differential driving mechanism in connection with one of the feeder-rolls and controlled by the last-mentioned means for imparting circuitous movements to the feeder of different velocities at predetermined points in the reciprocatory movements of the carrier.

22. The combination, with a supply-hopper and a supporting-frame therefor, of a feeder-carrier having slide-blocks at opposite ends thereof supported in horizontally-disposed guideways on the frame, which guideways are located, respectively, one above the other at opposite sides of, and below, the hopper, and said feeder-carrier also having two feeder-supporting rolls carried on said slide-blocks; an endless feeder extending around said rolls, with its material-carrying run below, and extending across the discharge end of, the hopper; means for advancing and retracting the feeder-carrier together with the feeder; and differential-speed actuating mechanism in connection with, and effective, on the advancing and retracting movements of, the feeder-carrier, for imparting feed movements of decreased and increased velocity, respectively, to said feeder.

23. The combination, with a supply-hopper and with a supporting-frame therefor having guideways for supporting a feeder-carrier; a feeder-carrier having slide-blocks supported on said guideways for reciprocatory movement; rolls carried by the slide-blocks; an endless feeder carried by said rolls; independent instrumentalities for actuating the feeder-carrier and feeder; and an adjusting device between the slide-blocks and effective for spreading said slide-blocks to draw the feeder taut.

24. The combination, with weighing mechanism including a load-receiver and with a supply-hopper, of an endless-band feeder coöperative with the supply-hopper; power-driven feeder-actuating mechanism including intermeshing driving and driven members supported with their axes in intersecting planes; and means controlled by the weighing mechanism for stopping the rotation of the driving member and for shifting the driven member bodily in parallelism with the axis of the driving member, whereby to reverse the direction of feed movement of the feeder.

25. The combination, with weighing mechanism, including a reciprocatory load-receiver and with a supply-hopper, of an endless-band feeder coöperative with the supply-hopper; power-driven feeder-actuating mechanism including two intermeshing rotative members one of which is operatively connected with the feeder; and means controlled by the weighing mechanism, at a predetermined point in the reciprocatory movement of the load-receiver, for stopping the rotation of one rotative member and for shifting the other member bodily in the plane of the axis of rotation of the first-mentioned member to effect a reversal in the direction of movement of the feeder.

26. The combination, with weighing mechanism including a load-receiver and with stream-supplying means, of an endless-band feeder coöperative with the stream-supplying means; power-driven feeder-actuating mechanism including a driving and a driven member, the latter of which is operatively connected with the feeder and is bodily shiftable in a plane intersecting the axis of its rotation; and means controlled by the weighing mechanism for starting and stopping the driving member to effect a reversal in the direction of rotation of the driven member.

27. The combination, with weighing mechanism, including a load-receiver and with stream-supplying means, of an endless-band feeder coöperative with the stream-supplying means; power-driven feeder-actuating mechanism including a driving-worm and an intermeshing worm-wheel, the latter of which is operatively connected with the feeder; and means controlled by the weighing mechanism for arresting the rotative movement of the worm, and for moving the worm-wheel bodily in a plane parallel to the axis of the worm to effect a reversal in the direction of rotation of said worm-wheel.

28. The combination, with weighing mechanism including a load-receiver and with stream-supplying means, of a stream-controller coöperative with said means and embodying a movable carrier having feeder-supporting rolls and an endless-band feeder carried by said rolls; feeder-driving mechanism including intermeshing driving and driven members, the latter of which is carried by one of the feeder-rolls; and means controlled by the weighing mechanism for arresting the movement of the driving member for shifting the driven member together with the stream-controller longitudinally of the axis of said driving member, whereby to reverse the direction of rotation of said driven member and the direction of motion of the endless-band feeder.

29. The combination, with weighing mechanism including a reciprocatory load-receiver and with a supply-hopper, of a stream-controller coöperative with said hopper and including a shiftable carrier having supporting-rolls and also an endless-band feeder carried by said rolls; feeder-driving mechanism including two intermeshing rotative driving and driven members, the driven member of which is carried by one of the feed-rolls; and means controlled by the weighing mechanism and effective, at a predetermined point in the movement of the load-receiver, for effecting a change in the velocity of the driving member, and effective at another point in the movement of said receiver for stopping the rotation of said driving member, said means including an instrumentality effective on the stopping of the driving member for shifting the driven member bodily in the plane of the axis of the driving member to effect a reversal in the direction of rotative movement of said driven member and in the direction of circuitous movement of the material-supporting run of the feeder.

30. The combination, with weighing mechanism including a load-receiver and with stream-supplying means, of a power-driven endless-band feeder coöperative with said means; feeder-actuating mechanism including a differential-speed driving member and an intermeshing driven member, the latter of which is operatively connected with the feeder; and means controlled by the weighing mechanism for first effecting a change in the velocity of, and then for stopping, the driving member, and also for shifting the driven member bodily along the driving member longitudinally to effect a reversal in the direction of said driven member.

31. The combination, with stream-supplying means, of a shiftable feeder-carrier including band-feeder-supporting rolls; an endless-band feeder supported on said rolls with its upper run intersecting the path of the supply-stream; a rotative driven member carried by one of said rolls; an intermeshing rotative driving member having its axis transverse to the axis of rotation of the driven member; means for rotating said driving member; and means for shifting the driven member in a plane parallel to the axis of the driving member concurrently with the rotative movement of said driving member.

32. The combination, with stream-supplying means, of a shiftable feeder-carrier including band-feeder-supporting rolls; an endless-band feeder supported on said rolls with its upper run intersecting the path of the supply-stream; a rotative driven member carried by one of said rolls; an intermeshing rotative driving member having its axis transverse to the axis of rotation of the driven member; means for shifting the driven member in a plane parallel to the axis of the driving member; and means in connection with, and effective for imparting rotative movements of different velocities to, the driving member at different points in the shifting movement of the driven member.

33. The combination, with weighing mechanism including a load-receiver and with stream-supplying means, of an endless-band feeder coöperative with the stream-supplying means; two coaxial driving members, one of which includes a worm; a driven member meshing with, and actuated by, the worm of one of the driving members and shiftable longitudinally of said worm; independent means for rotating the two driving members; connecting mechanism operative on the rotation of one driving member for coupling the same to the other driving member, and for rotating said last-mentioned member at a different velocity from that of the first-mentioned member, whereby to impart rotative movements of varying velocities to the driven member; and means controlled by the weighing mechanism for shifting the driven member longitudinally of the worm at a predetermined point in the operation of the weighing mechanism to effect a reversal in the direction of rotation of said driven member and in the direction of movement of the material-carrying run of the feeder.

34. The combination, with stream-supplying means and with a power-driven feeder coöperative therewith, of feeder-actuating mechanism comprising a primary and a secondary rotative driver; a rotary power-transmitter in operative connection with the feeder and primary driver; means for shifting the power-transmitter in a plane parallel to the axis of the primary driver; and means embodying a train of speed-reducing gears for rotating the primary and secondary drivers at relatively-different velocities.

35. The combination, with stream-supplying means and with a power-driven feeder coöperative therewith, of feeder-actuating mechanism comprising a primary and a secondary rotative driver having coincident axes of rotation, and the former of which includes a worm and a clutch member, and the latter of which has in operative connection therewith a train of speed-reducing gears and a clutch member coöperative with the clutch member of the worm and effective on the rotation of said secondary driver for coupling the two drivers together; independent actuators in connection with the primary and secondary drivers; and a worm-wheel operatively connecting the feeder and driving-worm.

36. The combination, with stream-supplying means and with a power-driven feeder coöperative therewith, of feeder-actuating mechanism comprising a primary and a secondary rotative driver having coincident axes of rotation, and the former of which includes a worm, and the latter of which has in operative connection therewith a train of speed-reducing gears; a clutch device, one member of which is carried by the primary and the other by the secondary driver, and which device is effective on the rotation of said secondary driver for coupling the two drivers together; independent actuators in connection with the primary and secondary drivers; a worm-wheel operatively connecting the feeder and driving-worm; and means in connection with, and effective for shifting, the worm-wheel transversely of its axis of rotation in a plane parallel to the axis of rotation of the drivers, to thereby move the feeder bodily in a plane transversely of the path of the supply-stream.

37. The combination, with stream-supplying means and with a feeder coöperative therewith, of feeder-actuating mechanism including two rotary driving members supported by, and in concentric relation with, the other; a train of speed-changing gears including a clutch connecting the driving members; a driven member in operative relation with one driving member and with the feeder and supported for movement transversely of its own axis and in parallelism with the axis of the driving member.

38. The combination, with stream-supplying means and with an endless-band feeder supported on rolls for circuitous movement and also for bodily-reciprocatory movements below said supplying means, of differential-speed feeder-actuating mechanism comprising a driving-worm; a power-transmitting worm-wheel fixed to one supporting-roll of the feeder and meshing with said worm; means for rotating the worm to impart a rotative movement to the worm-wheel and a circuitous movement to the feeder; and means for shifting the feeder and worm-wheel bodily in a path parallel to the axis of the worm, substantially as described.

39. The combination, with weighing mechanism including a load-receiver and with a supply-hopper, of an endless-band feeder supported for circuitous movement below the discharge end of said hopper; a feeder-carrier including feeder-supporting rolls; feeder-actuating mechanism including a driving and driven member in coöperative relation, and the latter of which is carried by one of the rolls of the feeder; means controlled by the weighing mechanism for effecting a change in the velocity of the driving member; and means also controlled by the weighing mechanism for shifting the driven member and feeder in a plane in parallelism with the axis of rotation of the driving member.

40. The combination, with weighing mechanism including a reciprocatory load-receiver and with a supply-hopper, of a feeder-carrier supported for reciprocatory movement below said supply-hopper and embodying feeder-carrying rolls; an endless-band feeder carried on said rolls with its material-supporting run oblique to the path of reciprocatory movement of the carrier; differential-speed feeder-actuating mechanism comprising two coaxially-rotative drivers, a train of speed-reducing gears including a clutch effective on the rotation of one driver for imparting a rotative movement of a different velocity to the other driver, and a power-transmitter in operative connection with the feeder and one of the drivers; means controlled by the weighing mechanism at predetermined points in the movements thereof for rotating first one and then the other driver; and means controlled by the weighing mechanism at predetermined points in the movements of the load-receiver for shifting the power-transmitter and connected feeder bodily longitudinally of the common axis of rotation of the drivers and in a path intersecting the path of feed movement of the material-carrying run of the feeder.

41. The combination, with stream-supplying means and with a material-advancing feeder, of differential-speed driving mechanism comprising a tubular primary shaft supported in suitable bearings and having a driving-pulley fixed at one end thereof; a worm fixed to said primary shaft and having a clutch member; a secondary driving-shaft extending through, and rotatable in, the primary driving-shaft and having a driving-pulley fixed at one end thereof; a gear of large diameter loosely mounted on the primary driving-shaft and having a clutch member coöperating with the clutch member of the worm; a gear of smaller diameter fixed to the secondary driving-shaft; a train of differential gears mounted on a stud and meshing with the two driving-shaft gears; and a power-transmitting worm-wheel meshing with the worm of the driving-shaft.

42. The combination, with a load-receiver having an oscillatory closer, of a load-sustaining plate pivotally supported within said receiver and between the receiving and discharging ends thereof, and an actuating-connector between the load-sustaining plate and closer.

43. The combination, with a load-receiver having an inclined bottom wall, of a closer pivotally supported on the load-receiver with its axis substantially midway between the side walls and below the inclined bottom walls of the said receiver; a closer-shutting actuator-plate pivotally supported within the receiver and above said closer; and an actuating-connector between the load-sustaining plate and closer, and effective on the opening movement of said closer for imparting a load-discharging movement to said sustaining-plate.

44. The combination, with a load-receiver having a downwardly-inclined deflecting-plate located above the discharge end thereof, of a closer pivotally supported on the receiver with its axis substantially in alinement with the vertical center of the load-receiver and embodying a closer-plate which, when the closer is in its closed position, is inclined upwardly toward the rear wall of the load-receiver; a closer-shutting actuator in operative connection with the closer; a load-sustaining plate pivotally supported on the inner end of the deflecting-plate of the load-receiver and having its outer end, when in position for sustaining the load, substantially in vertical alinement with the axis of the closer; and an actuating-connector between the sustaining-plate and the closer and effective, on the opening and closing movements of said closer, for simultaneously actuating the sustaining-plate.

FRANCIS H. RICHARDS.

Witnesses:
   JOHN O. SEIFERT,
   F. N. CHASE.